Figure 1:
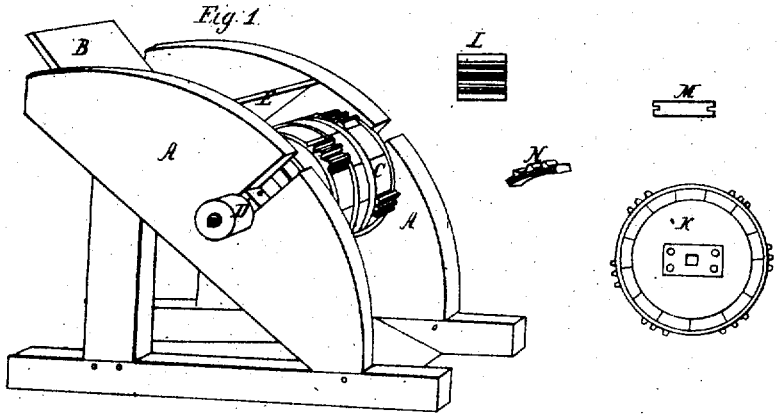
Figure 2:
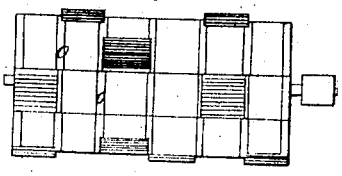
Figure 3:
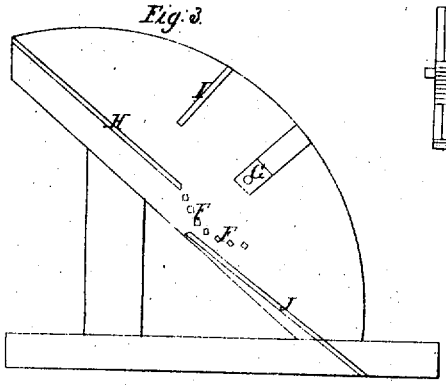

7584X

E. WARREN.
THRESHING MACHINE.

Patented May 17, 1833.

Witnesses;
Owen G. Warren
Wm. H. Boyd Day

Inventor;
Edmund Warren

Edmund Warren
Letters Patent.

The Schedule referred to in these Letters Patent and making part of the same containing a description in the words of the said Edmund Warren himself of his improvement in the Thrashing Machine The frame is constructed by two bed pieces two posts and two side pieces. The bed pieces are about four feet long. the posts about two feet, and are placed in the back part of the bed pieces. The side pieces are about twelve inches wide, and about four feet [illegible] inches long. the front ends of which are attached to the bed pieces. The back part is confined to the top of the posts. the incline is on an angle or about forty five degrees two cross pieces are placed in the posts and one in the forward part of the bed pieces, making the width two feet eight inches more or less, according to the power to be applied. This size is for four Horse power: sixteen inches wide is for one horse power. A cylinder is suspended about ten inches in front of the posts, the axle of which rests on the sides. The cylinder is formed by solid wood, or hollow, about eleven inches in diameter with the surface turned even.

About one fourth of the surface of the cylinder is covered with segments of wrought or cast iron about four inches long with wrought iron hoops within about three inches of each other. the segments of iron being so formed that the hoops pass into the ends of each about one half inch. Projections being in rows on each segment about one half inch from the base.

Two top pieces are placed on the side pieces over the axle of the cylinder, and the two side pieces at the back part form the entrance for the unthrashed grain. A concave of iron bars with the edges up is placed under the cylinder covering about twelve inches of the cylinder. A cover is put upon the top over the cylinder, to prevent the dust or chaff from rising, and a fender on the back part of the entrance about twelve inches high to prevent the unthrashed grain from passing over the cylinder. A table is placed at the back part of the machine

75847 when in use, of the height of the top of the concave a little below the cen-
tre of the cylinder. The parts claimed by me in this machine are the
segments and hoops of the cylinder so formed as to make a complete
surface of great strength without the use of screws or nails, and also
the form of the frame for cheapness and convenience Exd. Witness
WJC Henry Hilliard
J.M. Goldsmith Edmund Warren (574 words)

(Patented May, 17 1833.)

Dr in port folio